UNITED STATES PATENT OFFICE.

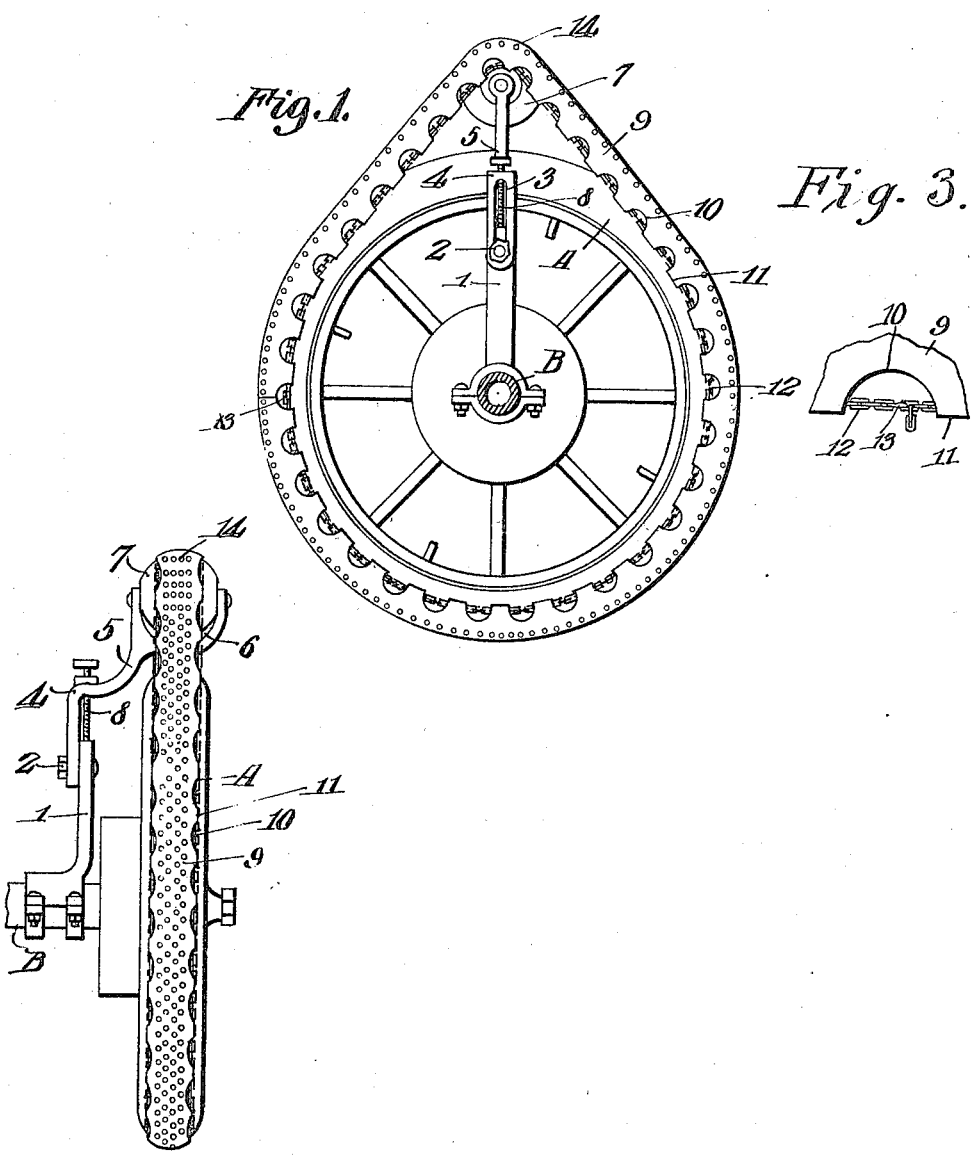

JOSEPH G. ANTHONY, OF DETROIT, MICHIGAN.

AUTOMOBILE-TIRE PROTECTOR.

964,363.  Specification of Letters Patent.  Patented July 12, 1910.

Application filed May 5, 1909. Serial No. 494,064.

*To all whom it may concern:*

Be it known that I, JOSEPH G. ANTHONY, a citizen of the United States, residing at Detroit, in the county of Wayne and State of Michigan, have invented new and useful Improvements in Automobile-Tire Protectors, of which the following is a specification.

An object of my invention is to provide an endless belt adapted to be engaged with an automobile wheel and with a pulley disposed immediately above the wheel, and to further provide simple and novel means for moving the pulley toward or away from the wheel so as to obtain the proper adjustment of the said endless belt and to securely hold the same in its operative position with respect to the tire.

Other objects and advantages will be apparent as the nature of the invention is better set forth, and it will be understood that changes within the scope of the claim may be resorted to without departing from the spirit of the invention.

In the drawing, forming a portion of this specification and in which like characters of reference indicate similar parts in the several views: Figure 1 is a side elevation of an automobile wheel showing my improved tire protector engaged therewith. Fig. 2 is an end view of the automobile wheel and tire protector. Fig. 3 is a detail side elevation of a portion of the armor.

Referring now more particularly to the drawing, there is shown an automobile wheel A of usual construction supported in any suitable manner upon an axle B. An L-shaped bracket 1 extends upwardly in a vertical plane from the axle B and is disposed inwardly of the wheel A as clearly shown. The bracket 1 is provided adjacent to its upper end with a clamping bolt 2 which extends through an elongated slot 3 formed in a member 4 which latter has an outwardly extending portion 5 provided with a forked end 6 disposed immediately above the wheel A. The forked portion 6 has revolubly mounted between its arms a spherical body 7 for a purpose to be hereinafter more fully described. The member 4 carries an adjusting screw 8, the lower extremity of which being engaged with the upper end of the bracket 1 so that when the clamping bolt 2 is loosened the said screw 8 can be manipulated so as to move the member 4 vertically and to adjust the portion 6 toward or away from the said wheel.

A protecting element 9 is employed and preferably consists of an endless belt of pliable material adapted to partly surround the tire of the wheel A, and as shown the said belt or protecting element is passed over the spherical body 7 carried by the member 4. The protecting element or belt 9 is provided along its longitudinal edges with scalloped portions 10 and between which are arranged a plurality of loops 11 through which a chain or other flexible element 12 is passed. The chains are each provided at one end with a snap hook 13 adapted to be engaged with a link of the chain for a purpose to be hereinafter more fully described. In placing the protecting element or belt 9 upon the wheel A and the revoluble object 7, the snap hooks 13 are released from links of the chains 12 and the member 4 is moved downwardly so that the object 7 lies close to the tire of the wheel, after which, the belt or protecting element 9 can be effectively placed in position. To retain the belt or protecting element in a concavo-convex form transversely the snap hooks may be locked or engaged with links of the chains 12. After the belt 9 has been engaged with the wheel and with the body 7 the screw 8 can be manipulated so as to move the member 4 upwardly causing the body 7 to move away from the wheel A, thus providing means for obtaining the desired tension on said belt. To prevent skidding I preferably provide the belt or element 9 upon its tread surface with a plurality of headed studs or rivets 14.

A protector as herein shown and described is simple in construction, and may be applied to vehicle wheels of various forms wherein are employed pneumatic or cushion tires, and when in use the protector will effectively prevent skidding, and will not only protect the tread surface of the tires with which it is engaged but in view of the peculiar shape of the protecting element or belt transversely it is obvious that the sides of the tire will also be protected and held against injury incident to its coming in contact with obstructions or with curves or the like.

In a device of the character herein set forth it is absolutely essential that means be employed for preventing sagging of the protecting belt 9, hence the provision of the hereinbefore described chains 12 which are engaged with the loops 11 formed upon the marginal edges of the said protecting belt. These chains, as stated, are provided with link engaging clasps which may be moved into their inoperative or disengaged positions so as to permit the protecting belt to be removed bodily from one side of the vehicle wheel and the belt supporting revoluble body.

I claim:

In a device of the class described, a vehicle axle having a substantially L-shaped bracket secured thereto, a cushion-tired wheel mounted on the axle at one side of the bracket, a clamping bolt extending laterally from the bracket, a slotted member engaged with the clamping bolt for vertical sliding movement thereon, said member having an outwardly curved portion whose extremity is formed to provide a fork-shaped bearing, a roller mounted between the arms of the fork and disposed immediately above the wheel on the axle, an adjusting screw mounted in the member to revolve therein and having its lower end engaged with the upper extremity of the bracket so that when the screw is operated the member can be moved vertically, and a protecting belt extending over the roller and partly around the cushion surface of the wheel.

In testimony whereof I affix my signature in presence of two witnesses.

JOSEPH G. ANTHONY.

Witnesses:
EDWARD ANTHONY,
Mrs. JAMES ANTHONY.